UNITED STATES PATENT OFFICE.

MAX BROWN, OF BROCKTON, MASSACHUSETTS, ASSIGNOR TO HAZEN-BROWN COMPANY, OF BROCKTON, MASSACHUSETTS, A CORPORATION OF MASSACHUSETTS.

CEMENT.

No. 879,241.      Specification of Letters Patent.      Patented Feb. 18, 1908.

Application filed September 13, 1907. Serial No. 392,769.

*To all whom it may concern:*

Be it known that I, MAX BROWN, a citizen of the United States, and resident of Brockton, in the county of Plymouth and State of Massachusetts, have invented an Improvement in Cement, of which the following description is a specification.

My invention relates primarily to those cements which have to be applied to a surface for a certain period before the surface can be handled or is ready to receive the article which is to be secured thereto. For instance, in what are known as the rubber cements commonly used in the shoe trade, it is necessary to apply the cement to the leather and then let it remain exposed to the air until the naphtha or other solvent has substantially volatilized before the leather piece can be applied to the article to which it is to be secured by the cement, and heretofore it has been necessary to make repeated trials each time in order to determine when the proper moment had arrived when the cemented surface was in condition for further use or application to the article.

The purpose of my invention is to do away entirely with the necessity for these trials or tests, and to render the cement capable of itself indicating visually the moment it has remained exposed on the leather surface the required length of time above explained. To accomplish my object, I incorporate with the cement a tell-tale substance which automatically changes the appearance of the cement in some radical manner when the critical moment mentioned has arrived, and, in the preferred embodiment of my invention, I depend upon a change in color. For instance, as long as the cement remains repellent or extremely fluid and not yet fit to stick articles together, it will remain pink, but the moment that it has set sufficiently for the application desired, or has partially dried out by the escape of the naphtha or other volatile solvent, it turns white. By this means the operator can determine at a glance whether a table-full of cemented shoe-uppers, for instance, are ready to be folded. If their cemented surfaces are still pink, they are not ready, whereas if they have become white, they are ready. In mentioning these illustrations, I do not intend to limit myself to color, nor especially to any particular color, nor to any particular kind of cement, inasmuch as my invention resides, broadly stated, in the artificial compounding of the cement in such a manner that, when spread out in a thin surface, it will when it sets automatically change radically its characteristics in a readily perceptible manner.

While my invention may be carried out in many ways, I have obtained the most satisfactory results by mixing with the solvent of the cement a very small portion of coloring matter, such as an anilin dye, the proportion varying with the kind and color of dye, the amount of coloring matter mixed in with the cement being only sufficient to give the cement a decided or striking color while the cement is in an extremely fluid or liquid state, as when first applied to a surface which is to be cemented to another surface. Pink is the color which I prefer, as it is readily perceptible to the eye, and yet it seems to vanish more decidedly or more readily than some other colors at the moment when the cement sets. When used in connection with ordinary boot and shoe cement, which is commonly known in the market as "rubber cement", the compound would consist approximately of fifty pounds of commercial rubber to one hundred gallons of naphtha, thirty pounds of resin, fifteen pounds of French chalk, and one quarter ounce of red anilin dye (soluble in naphtha). Compounded in these proportions, the cement will have a pink color. My invention may be said to reside, in part, in the discovery that a foreign coloring matter, as just explained, when introduced with the solvent, will remain conspicuous in the cement as long as the latter stays fluid or "wet" and will disappear or permit the cement to change to white when the latter is set.

In carrying out my invention, the prepared cement is applied with a brush or in any other usual manner to the surface which is to be cemented, and there it remains in its conspicuously colored condition, until the moment that it changes from a "wet" or smeary condition to a set condition, whereupon the color appearance disappears and the cemented surface turns white. The operator then knows at a glance that the article cemented is ready to be folded or applied to another surface, which, in the case of shoe manufacture, is accomplished by subjecting the leather pieces to a pounding or other heavy pressure together.

Without intending to limit myself in all respects to the above mentioned details, what I claim and desire to secure by Letters Patent of the United States is:

1. A shoe cement, containing coloring matter, giving it, when applied in a thin layer, a conspicuous distinguishing color changeable upon setting, and permitting the cement to change radically in color when it sets.

2. A compound, consisting of liquid shoe cement and coloring matter mixed together in such proportions as to give a thin layer of the wet compound a thin but readily perceptible color characteristic capable of radically changing in color upon the setting of the cement.

3. A shoe cement, containing a volatile solvent, having a coloring ingredient characterized by being changeable upon setting.

4. A shoe cement, containing a volatile solvent, having a coloring ingredient of anilin capable of being changeable upon setting.

In testimony whereof, I have signed my name to this specification, in the presence of two subscribing witnesses.

MAX BROWN.

Witnesses:
PETER J. MULLIGAN,
SURRON M. HERROD.